(12) United States Patent
Markel

(10) Patent No.: US 9,783,446 B2
(45) Date of Patent: Oct. 10, 2017

(54) NON-WOVEN TEXTILE CORES AND MOLDS FOR MAKING COMPLEX SCULPTURAL GLASS BOTTLE INTERIORS AND EXTERIORS

(71) Applicant: Jay Markel, Boulder, CO (US)

(72) Inventor: Jay Markel, Boulder, CO (US)

(*) Notice: Subject to any disclaimer, the term of this patent is extended or adjusted under 35 U.S.C. 154(b) by 0 days.

(21) Appl. No.: 14/953,261

(22) Filed: Nov. 27, 2015

(65) Prior Publication Data

US 2016/0152501 A1    Jun. 2, 2016

Related U.S. Application Data

(60) Provisional application No. 62/085,458, filed on Nov. 28, 2014.

(51) Int. Cl.
| | | |
|---|---|---|
| *C03B 9/28* | (2006.01) | |
| *C03B 11/10* | (2006.01) | |
| *C03B 9/32* | (2006.01) | |
| *C03B 9/48* | (2006.01) | |
| *B22C 9/10* | (2006.01) | |
| *B22D 29/00* | (2006.01) | |
| *C03B 40/02* | (2006.01) | |
| *C03B 9/347* | (2006.01) | |
| *C03B 19/02* | (2006.01) | |
| *C03B 25/02* | (2006.01) | |

(Continued)

(52) U.S. Cl.
CPC ............ *C03B 9/48* (2013.01); *B22C 9/00* (2013.01); *B22C 9/10* (2013.01); *B22C 9/24* (2013.01); *B22D 29/001* (2013.01); *B22D 29/003* (2013.01); *C03B 9/32* (2013.01); *C03B 9/347* (2013.01); *C03B 11/10* (2013.01); *C03B 19/02* (2013.01); *C03B 25/02* (2013.01); *C03B 40/02* (2013.01); *C03B 2215/02* (2013.01); *C03B 2215/07* (2013.01)

(58) Field of Classification Search
None
See application file for complete search history.

(56) References Cited

U.S. PATENT DOCUMENTS

| | | |
|---|---|---|
| 3,441,397 A | 4/1969 | Sturgill |
| 3,514,275 A | 5/1970 | Bray |

(Continued)

FOREIGN PATENT DOCUMENTS

| | | |
|---|---|---|
| DE | 10 2009 024791 | 12/2010 |
| EP | 029668 A2 | 6/1988 |

(Continued)

OTHER PUBLICATIONS

Machine Translation JP2002-114530A performed Feb. 7, 2017 by Google Patents.*
Dictionary.com—Lumen definition dictionary.com—Feb. 8, 2017.*

Primary Examiner — Lisa Herring
(74) Attorney, Agent, or Firm — Mountain IP, pLLC

(57) ABSTRACT

Provided herein are novel tools and methods for the formation of vessels having sculpted interior and exterior forms. Novel high-temperature non-woven textile forms may be used to create a glass vessel having a three-dimensional sculpted interior of almost any shape. The non-woven textile forms may also be used as molds to artfully sculpt bottle exteriors. The invention allows for unprecedented control over the form of glass objects in an industrially scalable process.

10 Claims, 4 Drawing Sheets

(51) Int. Cl.
*B22C 9/00* (2006.01)
*B22C 9/24* (2006.01)

(56) References Cited

U.S. PATENT DOCUMENTS

| | | | |
|---|---|---|---|
| 4,008,063 A | | 2/1977 | Kramer et al. |
| 4,766,944 A | * | 8/1988 | Sakuma ............... B22D 17/145 |
| | | | 164/305 |
| 5,779,756 A | * | 7/1998 | Chiquet ............ C03B 37/01268 |
| | | | 65/145 |
| 7,815,774 B2 | * | 10/2010 | Tsuura .................... B22C 1/167 |
| | | | 162/145 |
| 8,333,287 B2 | | 12/2012 | Lonsway |
| 2009/0301136 A1 | | 12/2009 | Mini |
| 2010/0189990 A1 | * | 7/2010 | Breault ............... H01M 4/8807 |
| | | | 428/311.51 |
| 2012/0297831 A1 | | 11/2012 | Bruneau et al. |
| 2013/0145797 A1 | | 6/2013 | Lequien et al. |
| 2015/0017351 A1 | | 1/2015 | Markel |

FOREIGN PATENT DOCUMENTS

| | | | |
|---|---|---|---|
| FR | 644690 | | 10/1928 |
| FR | 1 332 050 | | 12/1963 |
| FR | 1 450 312 | | 5/1966 |
| GB | 1 241 254 | | 8/1971 |
| GB | 1 602 027 | | 11/1981 |
| JP | 2002114530 A | * | 4/2002 |

\* cited by examiner

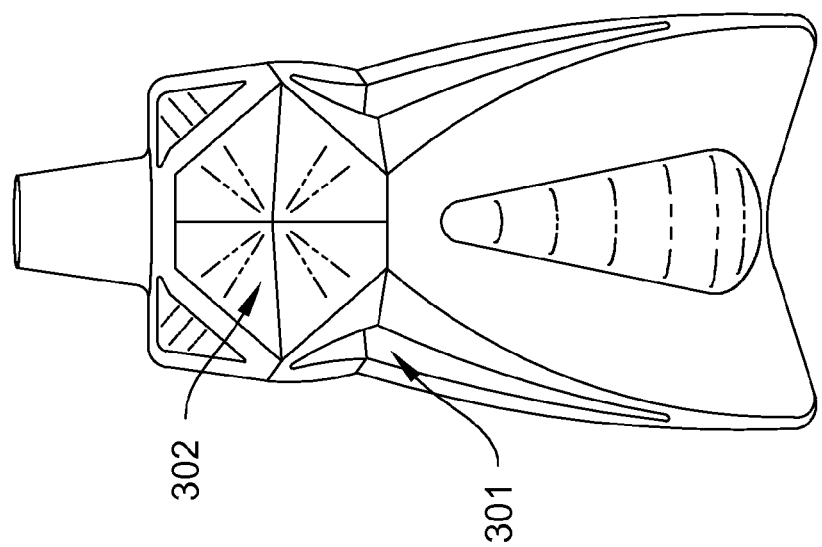
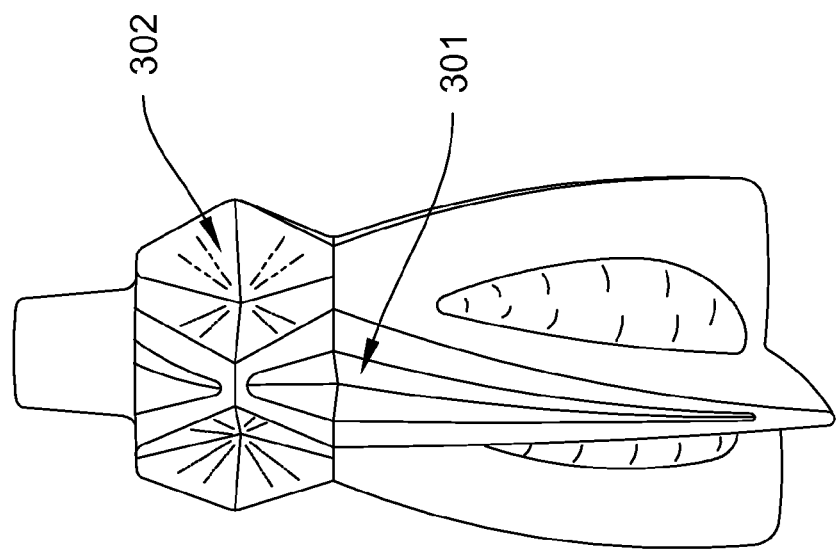

NON-WOVEN TEXTILE CORES AND MOLDS FOR MAKING COMPLEX SCULPTURAL GLASS BOTTLE INTERIORS AND EXTERIORS

CROSS-REFERENCE TO RELATED APPLICATIONS

This application claims the benefit of priority to U.S. Provisional Application Ser. No. 62/085,458 entitled "Non-Inflation Method of Making a Glass Vessel," filed Nov. 28, 2014, the contents which are hereby incorporated by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Glass vessels are ubiquitous in modern life. Often, such vessels are more than just functional containers. Various products, such as food products, wine, liquor, cosmetics, and expensive fragrances are presented in bottles or other vessels having artistic form. Sculpted bottle interiors or complex bottle exteriors, would be desirable for branding, marketing, and artistic purposes. Additionally, complex glass vessels may be desirable in an applied context, for example in the scientific or industrial fields, where complex vessel interiors are functional, for example as in microfluidics.

Glass vessels having complex interior three dimensional shapes would have considerable artful appeal and visual interest. However, in the 4,500 year history of glass making, methods of producing a vessel with a formed interior are limited, and making an enclosed vessel with a highly complex, artfully sculpted interior has been unobtainable. Likewise, making complex exteriors, for example with features having conflicting orientations, has been costly and has been limited to hand made artisanal methods, and has not been attainable by scalable, industrial means.

A 1928 patent, French Patent Number 644,690, by Gosselin and Caron, entitled "Procede de Fabrication des Objets en Verre," proposes a method to shape the interior space of a glass vessel with a core made from metal or an "easily destroyed substance," the identity of which easily destroyed substance is not specified beyond stating that materials used in the foundry industry may serve as a guide.

United States Patent Application Publication Number 20120297831, by Bruneau et al., entitled "Method and Installation for Manufacturing a Glass Bottle" describes a process for forming two half bottles, wherein the interior surface of the half bottles is shaped by means of a punch, followed by hot hot-welding the two halves to make a finished bottle. This method does not allow for monolithic production of vessels having a decorated interior from a single mold.

Another proposed method of sculpting a vessel's interior is the use of a punch having features that are imprinted on hot glass, for example as described in United States Patent Application Publication Number 20130145797, by Lequien et al, entitled "Method and Device for Forming a Hollow Glass Item." This method relies on removal of the punch while the glass is still hot and malleable and appears limited in the extent of non-draftable features that can be made. In addition, one side of the vessel must be left open to remove the punch, and then closed by an additional piece.

U.S. Pat. No. 8,333,287, by Lonsway et al., entitled "Bottle Neck with Internal Embossments and Method Manufacture," describes a method of forming ribs and other raised structures in the neck of a bottle, such as a longneck beer bottle. The rib features are apparently formed by pressing and the method appears limited in the range of forms that may be made.

U.S. Pat. No. 4,008,063, by Kramer et al., entitled "Apparatus for Producing Blown Hollow Glass Objects," describes a method of shaping the interior of a bottle by inserting a plunger into the bottle interior and imprinting a pattern on the heated glass. The geometry of the plunger is limited because it must be withdrawn from the bottle's mouth, which greatly limits the diversity of forms that can be made by the plunger.

European Patent Number 0296468, by Mannl, entitled "Profiliertes Flaschchen Aus Glas" describes a bottle having a sculpted interior consisting of longitudinal features. The bottles are produced by drawing shaped tubing, sectioning the tubing, and further processing the sections to create vessels.

Recently, a method of forming glass vessels having a sculpted interior has been demonstrated, as described in United States Patent Application Publication Number 20150017351, by Markel, entitled "Method for Making Sculptural Interior of a Vessel and Vessels Made Thereby." In this prior art technique, a textile core is inflated within a glass parison and the resulting vessel's interior will conform to the shape of the inflated textile core, which core can be deflated and withdrawn after the glass anneals. This method produces complex interiors that are not possible to make using a standard parison blow, however, the complexity of the core is limited to shapes and features that can be created in a sewn, or computerized knit, crocheted, or woven textile form. The creation of such forms remains dependent on the abilities of computerized knitting, weaving, and crocheting apparatuses, which, at this time, adds expense and complexity to the process.

In summary, none of the previously proposed or demonstrated methodologies enable the formation of diverse complex three dimensional interior forms within a glass vessel in a scalable process. Accordingly, remains a need in the art for a novel methods of making glass vessels with hollow interiors, wherein complex interior and/or exterior features can be made with a simplified one-piece process which is cost effective, and industrially scalable.

SUMMARY OF THE INVENTION

Provided herein are novel tools and methods for making glass vessels with complex interior and/or exterior forms, including glass bottles, vessels, objects of art, and scientific glass. The methods of the invention may further be used in the casting of metal objects. The methods of the invention utilize novel non-woven textile forms. The non-woven textile forms provide economically viable and industrially scalable technology for manufacturing complex glass bottle interiors and exteriors. The techniques disclosed herein are also useful in the manufacture of complex objects from other materials, such as metal, or ceramics.

BRIEF DESCRIPTION OF THE DRAWINGS

FIGS. 3A, 3B, and 3C depict different views of a complex bottle made using a mold of the invention.

DETAILED DESCRIPTION OF THE INVENTION

Figure 1:
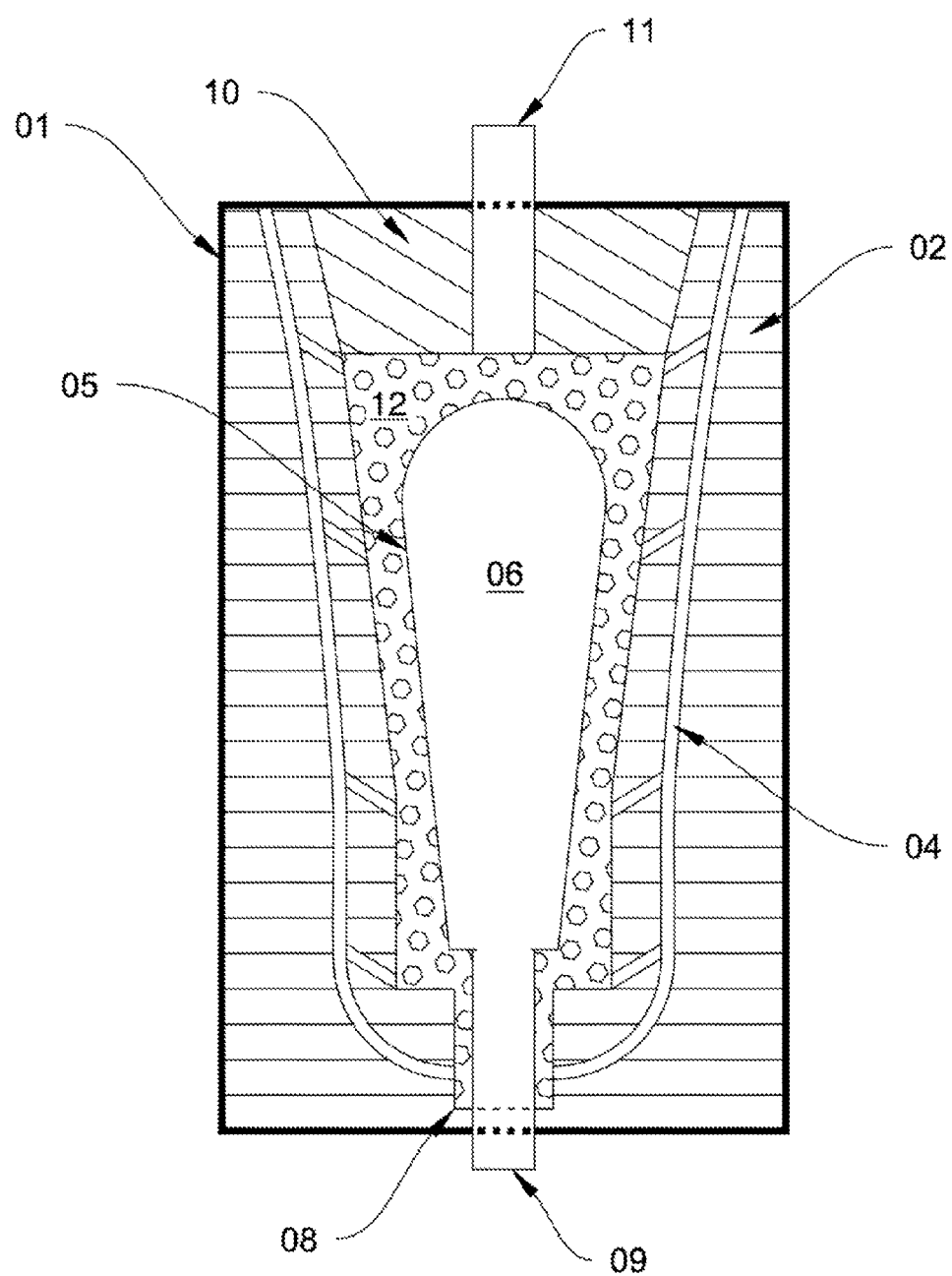
FIG. 1 is a cross sectional diagram depicting a core of the invention and a mold of the invention configured for bottle production in a backing mold.

The invention provides a means of making glass vessels, e.g. bottles, objects of art, or scientific glass having complex interior or exterior features. Additionally, the invention provides a means of forming complex objects from other materials. The complex features produced by the methods of the invention are enabled by the novel use of non-woven textile forms. These forms can be rigid, destructible (one time use) and provide a novel platform for the creation of unprecedented glass objects with techniques that can be readily integrated into existing manufacturing processes. The non-woven textile objects of the invention may comprise cores, which are utilized to create vessels having sculptural complex interior spaces, and which are additionally capable of imparting a high degree of detail to the surface within the bottle. The non-woven textile objects of the invention may further comprise molds, which are used to create vessels having complex sculptural outer surfaces, and are also capable of having a high degree of surface detail.

Non-Woven Textile Material.

A non-woven textile, as used herein, is a non-woven or non-knitted paper-like material composed of a solidified pulp comprising one or more constituent materials bonded together by one or more binding agents.

One constituent material that may be used in the non-woven textile material of the invention is carbon fiber, as known in the art. Carbon fiber is commercially available in various forms including milled powder and chopped fibers. The non-woven textile of the invention may comprise pure powder, pure chopped fiber, or a mixture of carbon fiber powder and chopped fibers. The mixture can be adjusted depending on the required properties of the body. For example, in the production of features having small details, a finer slurry is desirable (e.g., utilizing a finer powder and, or relatively more powder). Likewise, in applications where increased strength is desirable, strength of the non-woven textile body is increased by using relatively more chopped fiber and larger chopped fiber pieces. For example, one exemplary carbon fiber blend which can be used in the manufacture of non-woven textile bodies comprises milled carbon fiber powder of 150 microns (e.g. (ZOLTEK™ 99% pure) and chopped carbon fiber of 3 mm length (e.g. ZOLTEK™ 99% pure) may be used. For example, the constituent material may be a mixture of powder and chopped fibers in a ratio of 20-40% powder to 60-80% fiber.

Other constituent materials that can be used in the non-woven textile of the invention include materials such as alumina fibers, mullite fibers, and silica fibers. In some embodiments, the constituent material of the non-woven textile comprises a single material. In other embodiments, the constituent material comprises a mixture of different materials.

The non-woven textile of the invention comprises a binding agent. In the manufacture of the non-woven textile material, the binding agent is combined with the constituent material comprises in the form of a solution, the solution comprising a binding agent and a carrier fluid. The resulting mixture is a slurry, or paste which can be shaped and formed on a form or in a mold, as described below. The carrier fluid is subsequently removed and the constituent material or materials are held together by the binding agent. The binding agent may be any high-temperature tolerant material capable of binding the constituent material in a rigid or semi-rigid structure. For example inorganic binders have excellent stability at high temperatures. Exemplary binding agents include alumina, for example aqueous alumina, for example utilized in the form of colloidal alumina comprising alumina suspended in water, for example alumina in water at a percentage of 10-60% by volume, for example, Wesbond's Wesol A alumina binder. Other exemplary inorganic binding agents include silica and ceramic binding agents known in the art.

Manufacturing Non-Woven Textile Bodies.

The non-woven textile material of the invention is utilized in this embodiment to make various non-woven textile bodies. In one aspect, the scope of the invention encompasses any non-woven textile object. In another embodiment, the scope of the invention comprises non-woven textile bodies, which such objects may be utilized as cores or molds. A non-woven textile body, as used herein, is a rigid body comprising non-woven textile and having a selected form or shape. The non-woven textile bodies of the invention may be formed by various processes. In a general process, constituent material is combined with the binder solution to create a moldable mixture, for example a slurry. The mixture is subsequently molded or formed to the desired shape of the body by the aid of a mold or form. The high temperature binder is then solidified when dehydrated, (e.g. by active drying) to arrive at a rigid object.

The non-woven textile bodies of the invention may be formed by any process known in the art for molding or forming an object. The non-woven textile bodies are typically produced by the use of a structure comprising a mold or form (e.g. a negative to create a core, or a positive form to create a mold), such structure imparting the desired finished shape, and surface texture of the non-woven textile body. For example, metal or silicone forms may be used, allowing for virtually any shape or surface detail to be made. The use of a slurry advantageously allows the material and binder to be molded or formed into a rigid structure having a high degree of form and detail. Depending on the fineness of the constituent material, slurry can fill small spaces and is moldable to very fine tolerances, for example, in the micron to millimeter range.

For example, in one implementation, a pulping process is utilized to form the non-woven textile body, the pulp comprising the constituent material combined with the binder solution. Pulping processes, and methods of creating forms therefrom, are known in the art, for example in the formation of paper goods such as egg cartons, or dust protector masks. The slurry may further comprise coarse fibers, stands, tissue, or other materials which lend structural strength to the slurry after it is set. For example, woven or knit carbon fiber fabric, felted carbon fiber tissues, spun steel, or any other fibrous or filamentous materials capable of withstanding high temperatures may be included in the slurry. The slurry may be poured or otherwise deposited into a mold, or may be applied to a form, for example by injection or spraying.

In one embodiment, the slurry comprises a mixture of 20-60% carbon fiber blend, and 40-80% colloidal alumina by volume. The viscosity of the slurry can be modified to conform to the processes in which it will be used. For example, wetter, more liquid slurries are amenable to spraying and thicker slurries are amenable to pressing, or spinning.

Next, the molded or formed slurry is solidified. Pressure may be applied to the slurry-covered form to remove excess liquid. The slurry can be solidified by drying, for example with the aid of force air, heating, and/or the application of pressure to squeeze out liquid. It is necessary to remove all water or other liquid from the slurry, to avoid the formation of steam in the high temperature processes for which the bodies are to be used.

In an alternative embodiment, the non-wove textile bodies of the invention are formed by centrifugally spinning slurry within a mold, which closes the surface with a high degree of fineness, and assists in removing excess water. It can then be dried with air or heat. Wherein the non-woven textile comprises constituent materials of differing sizes, the centrifuging process advantageously aids in the differential distribution of such constituents within the profile of the non-woven textile.

In an alternative embodiment, the bodies of the invention are formed using a textile foundation, e.g. a carbon fiber textile or other material capable of withstanding high temperatures, for example a felted tissue, a knit, or a woven material. The material can be infiltrated with a slurry, or with the high temperature binder solution or liquid and subsequently applied to a mold or form, for example, in the same manner as plaster cloth or papier mache are used.

Advantageously, the non-woven textile bodies of the invention can comprise a single layer of non-woven textile material, for example, a single, paper-thin layer, having excellent strength and capable of being handled by automated equipment. If this thinnest form is desired it can be reinforced (e.g. made in a thicker layer or multiple layers) at specific areas of stress such as the attachment point of the core to equipment, or the outer mold. The non-woven textile bodies of the invention may also be formed in two or more layers. For example, a mold can be sprayed with a first layer of slurry which is then solidified, for example by drying. Second, third, and so on, additional layers can then be successively deposited on top of the first, as desired. In this way, the thickness and strength of the non-woven textile body can be increased by the use of multiple successive layers.

Layering also allows for adjusting the working surface of the non-woven textile body. The working surface is that surface that will be in contact with the hot glass or other material, for example the outer surface of a core or the inner surface of a mold. In one implementation of the invention, the non-woven textile body is formed by applying two or more layers having different compositions to a form. In some implementations, multiple layers are used in selected areas of the body in order to provide localized reinforcement. For example, the protruding tube of a core, as described below, may comprise multiple layers of non-woven textile material in order to strengthen it for machine handling and/or mounting on a structure in order to hold it in place in the mold.

It will be understood that the non-woven textile bodies of the invention may be constructed from multiple pieces. For example, molds may be made as complementary halves which are bonded together, for example by cementing with the binding agent, other suitable high temperature adhesive to make the finished object.

The resulting non-woven textile bodies of the invention should possess certain features. The non-woven textile bodies must be high-temperature, meaning the non-woven textile body is able to withstand temperatures of the glass making or metal casting process, for example temperatures of at least 1,200° C., without melting, combusting, or disintegrating.

The non-woven textile bodies are also rigid. The body must be sufficiently strong that it can withstand pressures that it will be subjected to during the molding or casting process in which they are used. For example, for use in glass vessel making, the non-woven textile body generally must be able to withstand pressures of at least 4 bars, or about 5-6 psi without collapsing, deforming, or cracking. Advantageously, the rigidity of the non-woven textile bodies of the invention makes them amenable to handling by automated equipment, for example, they may be readily utilized with standard IS Machine bottle making equipment.

For use in metal casting, non-woven textile bodies having substantial strength will typically be required. For metal this pressure is dependent on the metal's weight, and the volume of the casting. Very strong non-woven textile bodies can be made using reinforcing materials within the textile or by making multi-layered bodies. When a mold of the invention is used, it can also be additionally supported externally with an inexpensive readily available foundry material in common use, such as common dry sand or dry silica sand in a flask surrounding the mold to the method.

The non-woven textile bodies of the invention are also destructible. A destructible non-woven textile body, as used herein, is a body comprising non-woven textile, wherein such body can be torn, cracked, or ripped or otherwise mechanically disrupted by the application of force, for example, manual force and/or the integrity of the body can be disrupted, e.g. softened or disintegrated by contacting it with water or other liquid. In one implementation, the non-woven textile bodies of the invention are self-destructing, as described below, such that the industrial process of forming a glass vessel causes the non-woven textile body to weaken, crack, break, or fracture. In another embodiment, non-woven textile body comprises filaments or mesh, a portion of which protrudes from the non-woven textile body. Such elements can act as a "rip-cord," that when pulled, aids in the breakup of the non-woven textile body.

The carbon fiber non-woven textiles of the invention provide a very unique material that has both sufficient rigidity and destructibility. Bodies made from this material can be paper thin, but are able to withstand the uniform pressures applied in the initial process of forming a vessel or other object in a glass molding or metal casting process. At the same time, the bodies are destructible and can be subsequently mechanically disrupted to facilitate their removal or separation from the object formed therewith, for example by vacuum.

Finishing.

Generally, it is desirable that the non-woven textile body is easily released from the finished item once it has been formed. Advantageously, the non-woven textile bodies of the invention do not allow the glass to burn in, and will readily release from the glass. However, to further promote clean release, the working surface of the non-woven textile body may optionally be treated with suitable materials to promote easy separation from the glass, metal, or other material utilized, or to prevent any adhesion. The treatment may comprise spraying, painting or dipping the working surface with a finishing agent, for example a solution of micro-fine graphite. For example, a solution of 10-30% by volume micro-fine graphite in colloidal alumina may be used. Zircon, for example, in combination with colloidal alumina, may also be used as a releasing agent.

The working surface of the non-woven textile body is highly amenable to receiving a finishing coat, and be treated with other agents, for example agents that add color, hue, i.e., a patina or other visual characteristics or special effects to the finished product. For example, the use of various fluxes with mineral oxides to patina the glass as finishing agents to impart color to glass is known, for example as described in European Patent Number EP1894899, by Brocheton, entitled "Glass Articles and Process for Making the Same."

Creating Sculptural Bottle Exteriors with Non-Woven Textile Molds.

The non-woven textile bodies of the invention may comprise molds. A mold is a hollow body into which hot glass, e.g. comprising a glass gob or multiple gobs, is introduced, wherein the material is blown or pressed such that it pushes up against the working surface of the mold and assumes the shape defined by the working surface of the mold.

In one aspect, the scope of the invention encompasses a mold comprising non-woven textile body which can be used to shape the exterior form of a glass object. The shape of the inner surface of the mold will define a vessel, for example a bottle, for example a bottle having a neck. The mold will comprise at least one opening, which one or more openings may allow for the introduction of heated glass, a blow port, or, optionally, a core. The one or more openings may also define the opening of the vessel, e.g. the mouth of a bottle, formed as known in the art.

The molds of the invention may be formed monolithically, or as two (or more) symmetrical or asymmetrical pieces, utilizing any fabrication methods known in the art. For example, pulp may be sprayed or other wise distributed onto or into a form. The pulp may subsequently be pressed, or centrifugally spun into the form to assure that it conforms to the surface details thereof, and to aid in removal of carrier fluid, and thereby facilitate drying. Air and or heat may be applied to solidify the illcore and to complete dehydration prior to use.

The molds of the invention may comprise vents. The vents are small channels that connect from the exterior of the mold to the hollow interior, for example as depicted in FIG. 1 (04). Alternatively, the mold may comprise one or more perforations, e.g. pinholes, for example as described below for cores. The vents and/or perforations are utilized to allow venting of air from the hollow portion of the mold as the hot glass is introduced. Vents allow for the passive flow of air from the mold, or the assisted withdrawal of air by drawing a vacuum to aid the evacuation of air from the a mold, as known in the art.

Typically, glass bottles are made using two-piece molds, e.g. steel molds. The shapes made by such molds must be draftable with respect to each of the half-molds that forms them. This allows for some adornment of bottles and other vessels with, but such features are limited to a single orientation, parallel to the linear direction of the pull of the mold, in order to preserve their draftability. Advantageously, the molds of the invention, being destructible, may comprise undercuts, indentations, and other features without limitation as to the orientation of such features, i.e. two or more features of non-parallel orientation may be used, which is not possible to attain with a standard two piece steel mold.

Figure 3C:
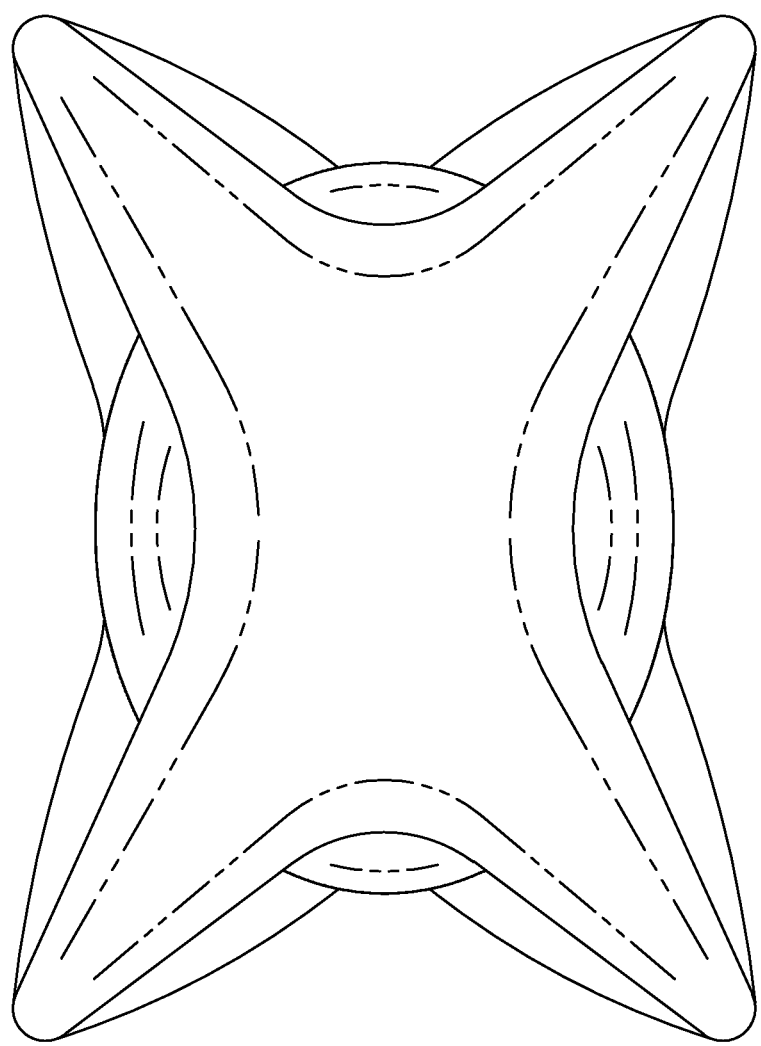

For example, FIGS. 3A, 3B, and 3C depict frontal, perspective, and bottom views of an actual glass bottle made using a mold of the invention. The bottle comprises indents (301 and 302) which are not parallel and which could not be formed using a standard two-piece mold fabricated from steel. Likewise, the molds of the invention may be used to create complex surface details, for example, fine details of very small dimension, such surface details comprising two or more conflicting orientations.

In one aspect, the invention is directed to a method of making a vessel utilizing a mold comprising non-woven textile. The mold may be manufactured as described above, for example by a slurry sprayed or otherwise formed around a form which defines the shape of the mold. For example, the mold may comprise carbon fiber, for example a mixture of chopped and milled carbon fiber formed using a binder solution such as colloidal alumina.

In one implementation, the method is practiced as follows: hot glass (e.g. a gob or gobs) is introduced into a non-woven textile mold, the hot glass being pressed, blown, or otherwise forced, such that it conforms to the inner surface of the mold; next, the formed glass is annealed; subsequently, the glass is allowed to fully cool, with the formed a glass vessel within the mold; and finally, the mold is removed from the glass vessel.

In one embodiment, the molds of the invention are utilized to make vessels in a blow process. In such a process, a single gob, or multiple gobs, of hot glass may be introduced into the mold, the gob or gobs then being blown up against the inner surface of the mold using compressed air, as known in the art, forming a bottle or other vessel. The mold will comprise one or more openings that may be configured as known in the art for the introduction of one or more blow ports and for the introduction of a gob or gobs into the hollow portion of the mold. An opening into which a gob is introduced may be closed by application a mold closure piece, as known in the art. A mold closure piece may comprise non-woven textile, or may comprise standard mold materials such as steel, and will shape that portion of the hot glass exposed to it by the opening in the mold to which it is applied. In one embodiment, the vessel being formed is a bottle and the bottom of the bottle is formed by the mold closure piece. After introduction of the gob or gobs and mold closure, blown air forces the hot glass to conform to the inner surface of the mold, creating the vessel.

Molds utilized in a blowing process may optionally utilize a core, wherein the air forces the glass to fill the space between the outer surface of the core and the inner surface of the mold. In an alternative embodiment, the vessel is formed using a core in a pressing process. In such embodiment, a gob is introduced into the mold through an opening in the mold, and a mold closure piece is applied to close the opening, which piece also applies pressure to the introduced glass to ensure a complete and uniform fill of the mold, filling the space between the inner surface of the mold and the outer surface of the core.

During the introduction of the glass into the mold and formation of the vessel, a vacuum may optionally be pulled on the mold or through vents present in the mold, to assist in the complete filling of the mold cavity by the glass.

The glass introduced into the mold is subsequently annealed and then allowed to fully cool. In certain applications, the annealing step may be omitted. The mold is then removed from the newly formed vessel.

During the annealing process, the formed vessel and the mold containing it may be subjected to hours of high-temperature treatment (e.g. temperatures of hundreds degrees Celsius). In one implementation of the invention, the mold is designed with a strength that is sufficient to withstand the initial vessel forming process, but which is low enough that the extended heating experienced during the annealing process substantially diminishes the structural integrity of the mold, such that it is readily removed after the vessel has been annealed and cooled. Such a mold will be termed a "self-destructing mold" in that its strength is precisely tuned for a given industrial process such that the annealing process causes it to be structurally diminished. Advantageously, this self-destructing mold is readily removed from around the newly formed vessel, for example by vacuuming or blowing away the fragments. In some implementations, a disruptive action will be necessary to weaken, crack, or break the mold surrounding the newly formed vessel. For example, in one embodiment, physical force is applied, e.g. by automated tools, to aid in the breaking, cracking, tearing or other disruption of the mold, or by pulling of filamentous rip-cord elements. Additionally, in some embodiments, water may be used to soften the non-woven textile body comprising the mold, making it easier to remove.

In one embodiment, the non-woven textile mold may be readily adapted to fit within a steel jacket, or flask, which can be readily adapted to the hydraulics of I.S. bottle making machines or other equipment. This steel backing mold will give support to the non-woven textile mold and will facilitate industrial handling of the molds during production.

Shaping Vessel Interiors Using Non-woven Textile Cores.

In one embodiment, the scope of the invention encompasses a non-woven textile core. The core is used to define the inner shape of a glass vessel. The core has a hollow body comprising an exterior shape or form, which such shape or form will define the shape and features of the interior space of the finished vessel. The core further comprises a tube, or other hollow extension, which projects from the body of the core, the lumen of which tube is continuous with the hollow space in the body for example, as depicted in FIG. 1 (09) and FIG. 2 (21). Such tube will create an opening in the vessel, from which the core can subsequently be extracted, as described below, and which opening also creates a means to fill and empty the vessel. For example, if the vessel is a bottle having a neck, the neck will surround the tube and the distal end of the tube which exits the mold will define the mouth of the bottle. This protruding section of the core also provides a means of attaching the core to a vacuum source, as discussed below. Furthermore, the protruding section of the core provides an attachment point for holding the core in the proper position within the mold.

Figure 2:
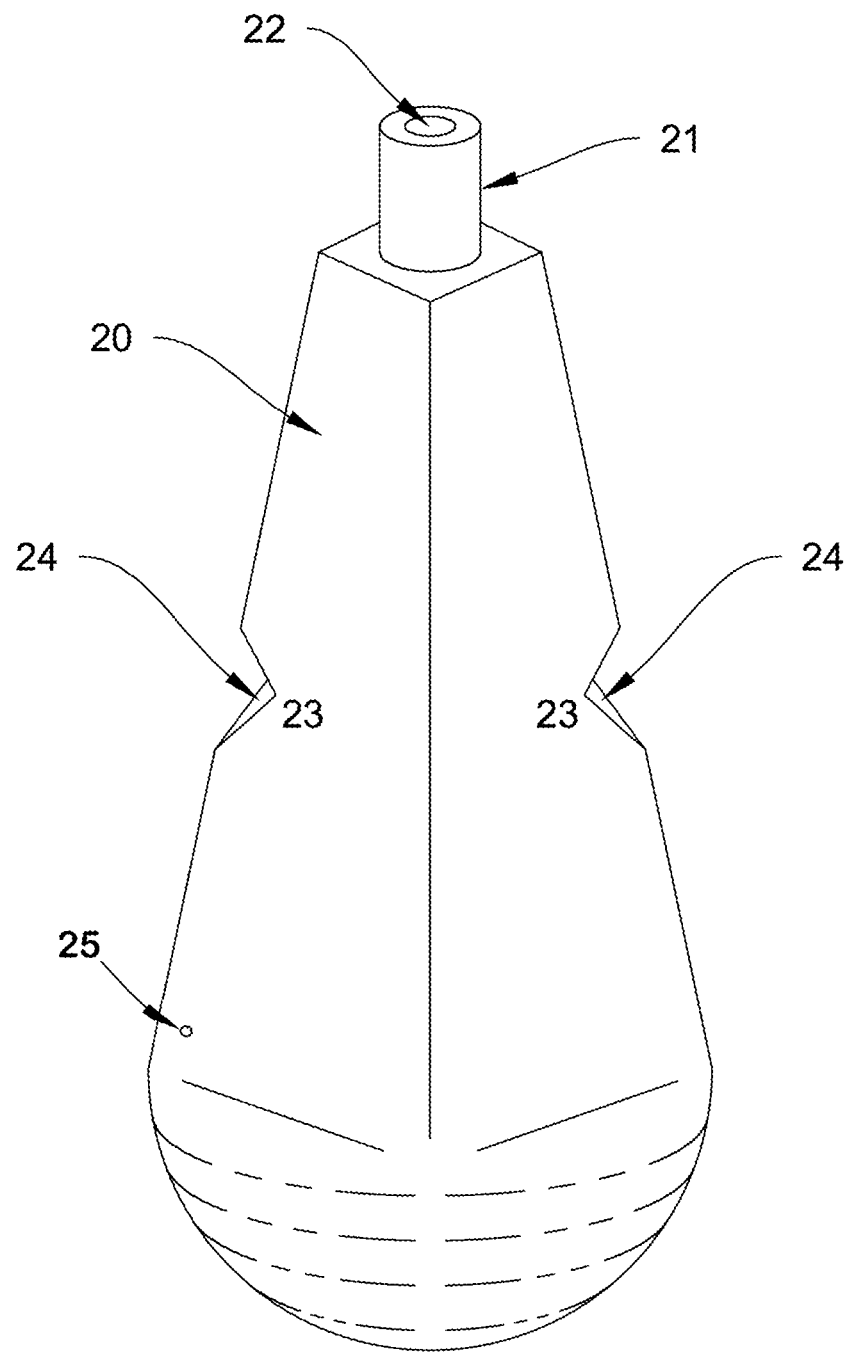
FIG. 2 depicts an exemplary non-woven textile core of the invention.

Advantageously, the cores of the present invention may assume almost any three dimensional shape and may comprise limitless features, such as protrusions, indentations, and other intricate features. An exemplary core is depicted in FIG. 2. Note that the base of the exemplary core in FIG. 2 is wider than the top portion, and that this core also comprises undercut features (24), which such properties are precluded for any rigid, non-destructible tool used to shape a bottle interior. The core may further comprise one or more perforations, for example, pinholes. For example, a core comprising a pinhole (25) is depicted in FIG. 2. These perforations may in some cases be necessary to allow air to escape from the mold during the vessel forming process as it is displaced by the glass. Perforations should be sufficiently small that the hot glass does not ingress into the pinhole. In general, for glass, perforations of 5-200 microns, for example, may be used. Perforations can aid in the hot glass filling cavities and preventing the formation of localized air bubbles that prevent close coverage of the core by the hot glass.

The scope of the invention encompasses non-woven textile cores and methods of making such cores. For example, the scope of the invention encompasses a non-woven textile core comprising carbon fiber, for example a carbon fiber core manufactured from a slurry of milled carbon fiber powder and chopped carbon fiber bonded with colloidal alumina.

The scope of the invention further encompasses methods of utilizing the cores described herein. In one aspect, the invention is directed to a method of making a glass vessel utilizing a non-woven textile destructible core. In one implementation, the method is practiced as follows: a non-woven textile destructible core is placed within a mold such that a continuous space between the inside surface of the mold and the outer surface of the core surrounds that portion of the core that is within the mold, and at least a portion of the tube protrudes from the mold; wherein hot glass, e.g. a gob or gobs, is introduced into the mold, wherein the glass can be pressed, or blown, optionally assisted by drawing a vacuum in the core, such that the glass fills the space between the outer surface of the core and the inner surface of the mold to form a vessel; wherein the formed vessel undergoes an annealing process; forming a solid glass vessel having a hollow interior portion, the shape of which hollow interior portion is defined by the core; and finally, wherein the core is subsequently removed from the hollow interior portion of the vessel.

An exemplary setup for practicing the invention is depicted in the diagram of FIG. 1. This cross sectional diagram depicts an exemplary core (05) of the invention suspended within an exemplary non-woven textile mold (02) of the invention. The core comprises a hollow body (06) and a tube (09), the end of which tube protrudes from an opening in the bottom of the mold. The core has a hollow region (12), and the space between the core (05) and the inner surface of the mold will define the shape of the vessel to be formed. A venting system (04) is in connection with the hollow space (12), which will allow air to escape during the introduction of the hot glass. The mold comprises an opening at its, which is sealed by a mold closure piece (10). A blow port (11) may optionally be present to distribute hot glass within the mold.

In one embodiment, the non-woven textile core is set within a standard steel mold of an I.S. machine. In this embodiment, the protruding tubular section of the core could be sized to fit over the blow port of an existing I.S. machine, aiding in the suspension of the core within the mold. To clarify, the blow port is used structurally to support the core, and air will not be blown into the core. Additionally, the existing I.S. blow port may be connected to a vacuum source rather than a source of compressed air in order to draw a vacuum from the core during the bottle making process, assuming the core has perforations.

In an alternative embodiment, the mold used is a non-woven textile mold of the invention.

The core may comprise stabilizer features which hold the core in place within the mold. For example, if the vessel is formed using machinery having a blow port, the stabilizer feature may comprise a reinforced neck for fitting the protruding tube of the core over the blow port. Alternatively, if used in a non-woven textile mold, the stabilizer may comprise a structure, e.g. a protrusion, that aids in holding the core within the mold. The core may also be held in place in the mold with the aid of a binder, or suitable high temperature adhesive.

In one embodiment, the portion of the core which protrudes from the mold is connected to a vacuum source, for example, tubing, which such tubing applies a gentle vacuum (e.g. 3-4 bars). In combination with a plurality of perforations in the core, the vacuum aids in the withdrawal of air from the interstitial space between the exterior surface of the core and the inner surface of the mold, the air being displaced by the introduced glass and passing into the core via perforations in the core.

After the glass is introduced, formed, and annealed, it is allowed to cool. After the material has cooled the core may withdrawn from the interior of the vessel.

The cores of the invention may be self-destructing, i.e. the core may be designed for use in a specific industrial process wherein the strength of the core is tuned such that it can withstand the forces of the hot glass being pressed around it during vessel formation, but is not strong enough to withstand the subsequent extended heating of the annealing process without substantial disruption of its structural integrity. Additionally, the core will be subjected to forces generated by shrinkage of the vessel during the annealing process, such that the annealing process weakens, fractures, or otherwise disrupts the integrity of the core, promoting its simple removal from the interior hollow of the vessel. For example, in one embodiment, the self-destructing core is sufficiently fractured or weakened during the annealing process that it can simply be removed by vacuuming.

In some cases, mechanical disruption of the core may be necessary to remove it from the interior of the newly formed vessel or to break the remaining pieces into small fragments able to pass through the opening. Small probes (e.g. a scraper, for example a Teflon scraper) or other objects may be inserted into the interior of the vessel to aid in core separation and breakup. Core fragments can be removed by vacuum pressure. (In some embodiments, the breakup of the core is assisted by contact with water or other liquid.

Articles of Manufacture of the Invention

The compositions and methods of the invention may be utilized in the manufacture of any number of objects. In one aspect, the scope of the invention encompasses any article of manufacture made using the molds and/or cores of the invention, or made using the methods of the invention. For example the creation of objects using non-woven textile bodies in monolithic processes is within the scope of the invention.

For example, the compositions and methods of the invention may be used in the manufacture of glass vessels. In one embodiment, the vessels of the invention are glass bottles or jars, for example, bottles or jars used for food items, wine, liquor, fragrance, or cosmetics. It will be understood that the compositions and methods of the invention may also be used to form other glass objects, such as bowls, or objects d'art, which may, or may not have an enclosed interior.

The compositions and methods of the invention allow for the formation of glass vessels and other objects having intricate interior and/or exterior features. Such features may comprise any three dimensional shape or form, for example geometric forms, abstract forms, and natural forms (e.g. depicting items found nature such as plants, animals, etc.). Furthermore, lettering or logos may be depicted in the features of the articles of manufacture of the invention.

In one implementation of the invention, the complex interior or exterior of a glass vessel can be precisely modeled to depict an actual object. For example, using 3D scanning technology, an existing object, for example a sculpture such as Rodin's "The Kiss", or the bust or full figure of a celebrity, could be scanned, and the resulting 3D map of the object can then be used to create a mold or core based thereon, at very high resolution.

In another embodiment, the glass vessels or other objects made using the invention comprise functional vessels or objects. The immense flexibility of the methods of the invention allows for the formation of objects with almost any geometry, and such forms may be utilized in specialized functions. For example, the scope of the invention extends to vessels having a specialized interior (or exterior) form that enables their use in microfluidic systems, scientific instruments, or in the manufacturing or culinary arts.

Metal Casting and Other Materials

The non-woven textile material of the invention may advantageously be used as an investment for casting in the manufacture of objects other than glass objects. For example, metal objects, including, for example, objects made of stainless steel, titanium, and high carbon alloys. For example, the (forms and methods of the invention may be used to fashion objects from hard, high temperature, high performance alloys used in aerospace, nuclear, and medical industries, where intricate functional pieces are required. For example, personalized medical implants, based on the size and shape of extant structures in a patient, may be formed using the methods of the invention.

The invention encompasses the use of non-woven textile molds for forming metal objects, and further encompasses the use of non-woven textile cores for forming metal vessels having a defined interior space. For example, investment castings may be created using the non-woven textiles of the invention. When the non-woven textile material is used as an investment material, the wax, with the gating system, can be dipped or sprayed on, a first layer of fine slurry, followed by one or more increasingly heavier slurry mixtures, just as is done with ceramic shell in prior art investment casting techniques.

In another embodiment, ceramic objects, for example high performance ceramic objects, e.g. as used in high tech industrial applications, may be formed using the molds or cores of the invention.

Recycling of Materials

In some implementations of the invention, carbon fiber is used to form the non-woven textile. Carbon fiber is generally an expensive material. However, carbon fiber can be used effectively and economically in the practice of the invention. First, the carbon fiber non-woven textiles described herein may be manufactured as very thin sheet-like material, e.g. paper thin, reducing the amount of carbon fiber required per piece. Advantageously, the carbon fiber can be also be recovered and reused. For example, cores and molds can be crushed, cut, and rehydrated with water and the resulting mixture can be filtered, fractionated, or otherwise separated to recover the carbon fiber powder, chopped carbon fiber, and alumina for re-use.

Example 1

A slurry was formed. The constituent material of the slurry was carbon fiber, comprising about 30% milled carbon fiber powder (ZOLTEK™ PANEX 30, milled carbon fiber of 150 micron size) and about 70% chopped carbon fiber (ZOLTEK™ PANEX 35, 3.17 mm chopped fiber). These carbon fiber constituents were stirred with a commercially available colloidal alumina solution (Wesol A, by WesBond), comprising about 35% alumina. The slurry was created using about 2:3 carbon fiber to colloidal alumina solution (by volume).

A hollow core was made by applying the slurry to a negative form. The core was an elongated body. A tube of about 0.5 inches in diameter protruded from the narrow end (top) portion of the core. Two stabilizer projections projected from the tube at its top portion.

The slurry was also used to make a mold. A half mold was formed by applying the slurry to a positive form, which had a relief section, the relief section comprising multiple complex features, including non-parallel indentations. The mold also comprised a lip which encircled the relief portion. The lip comprised semi-circular channels connecting the outer surface of the mold to the relief portion. Two such half-molds were formed from the positive. The two half molds were then adhered together to form a hollow mold by cementing along the lip with colloidal alumina. Once dried, the mold was durable and could be handled. The complementary semi-circular channels on each half mold formed circular channels on the assembled mold, the channels comprising a lumen connecting the interior hollow portion with the outside of the mold.

The mold was placed in a steel backing mold surrounded by sand. The core was then placed within the mold, held in place at the mouth of the mold by the stabilizers.

Melted glass at about 2400 degrees Fahrenheit was poured into the space between the inner surface of the mold and the outer surface of the core. The introduced glass was pressurized by the use of a mold closure piece, which fit within the open end of the mold and pushed the hot glass into the mold.

The glass was allowed to solidify for a few minutes and then the glass-filled mold was moved to an annealing oven and annealed for a period of eight hours. The carbon fiber mold was then torn away and the carbon fiber core was pulled from the mouth of the bottle. The separation of the mold from the bottle was clean and the bottle had a high luster surface comparable to industrially produced glass. Remaining fragments of the core were removed by disrupting the core with hand tools and removing the fragments by vacuum.

The resulting bottle had a shape substantially as depicted in FIGS. 3A, 3B, and 3C.

All patents, patent applications, and publications cited in this specification are herein incorporated by reference to the same extent as if each independent patent application, or publication was specifically and individually indicated to be incorporated by reference. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

What is claimed is:

1. A method of creating a shaped object, comprising
contacting heated glass with a form comprising a non-woven tile, wherein the non-woven textile comprises a mixture consisting of chopped carbon fiber, carbon fiber powder having a particulate size of 150 microns, and an inorganic binding agent comprising alumina, such that the heated glass conforms to the shape of the form;
allowing the heated glass to cool and solidify; and
removing the form from the shaped object.

2. The method of claim 1, wherein
the shaped object is a vessel having a shaped outer surface;
wherein the form comprises a mold; and
wherein contacting the heated glass with the mold comprises
introducing the heated glass into a hollow portion of the mold and
blowing, pressing, or otherwise forcing the introduced heated glass to conform to an inner surface of the mold.

3. The method of claim 2, wherein
the mold comprises two or more protrusions, indentations, undercuts, or surface details of conflicting orientation.

4. The method of claim 2, wherein
the mold is self-destructing during the cooling process and is removed from the vessel by vacuuming or blown air.

5. A method of forming a vessel having a shaped interior, comprising the steps of
suspending a core within a mold, wherein the core comprises a hollow body and a hollow tube projecting from the hollow body: wherein the core comprises a non-woven textile, wherein the non-woven textile comprises a mixture of chopped carbon fiber, carbon fiber powder, and an inorganic binding agent: wherein the hollow body is wider than the tube; wherein a continuous space is present between the outer surface of the core and the inner surface of the mold; and wherein at least some portion of the tube projecting from the hollow body of the core protrudes from the mold;
introducing heated glass into the continuous space between the core and the mold, such that heated glass surrounds the portion of the core present within the mold and forms a vessel having a hollow interior portion;
allowing the heated glass to cool; and
breaking and removing the core from the interior hollow portion of the vessel, the shape of the interior hollow portion being defined by the portion of the core that was present within the mold.

6. The method of claim 5, wherein
the core comprises a plurality of perforations.

7. The method of claim 6, wherein
a vacuum source is connected to the hollow tube portion of the core protruding from the mold and suction is drawn from the core concurrent with the introduction of the heated glass into the mold.

8. The method of claim 5, wherein
the core is self-destructing during the cooling process and is removed from the hollow interior portion of the vessel by vacuuming.

9. The method of claim 8, wherein
the mold is mechanically disrupted to facilitate its removal by the application of force or contact with water.

10. The method of claim 5, wherein
prior to its removal from the vessel, the structural integrity of the core is disrupted by the application of mechanical force and/or the application of water or other liquid.

* * * * *